US012746620B2

(12) United States Patent
Lu et al.

(10) Patent No.: US 12,746,620 B2
(45) Date of Patent: Sep. 29, 2026

(54) SINGLE-BEAM DOUBLE-PHYSICAL-EFFECT COORDINATING AND DISTRIBUTING METHOD APPLICABLE TO UNIFORM LASER SHOCK AND APPLICATION THEREOF

(71) Applicant: SHANDONG UNIVERSITY, Jinan (CN)

(72) Inventors: Guoxin Lu, Jinan (CN); Heng Li, Jinan (CN); Zhong Ji, Jinan (CN); Koji Sugioka, Wako (JP); Changfeng Yao, Jinan (CN); Jinshan Li, Jinan (CN); Guoqun Zhao, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 1261 days.

(21) Appl. No.: 17/675,088

(22) Filed: Feb. 18, 2022

(65) Prior Publication Data

US 2022/0266391 A1 Aug. 25, 2022

(30) Foreign Application Priority Data

Feb. 24, 2021 (CN) ......................... 202110205524.4

(51) Int. Cl.
*B23K 26/356* (2014.01)
*B23K 26/073* (2006.01)
(Continued)

(52) U.S. Cl.
CPC .......... *B23K 26/356* (2015.10); *B23K 26/073* (2013.01); *B23K 26/122* (2013.01); *B23K 26/70* (2015.10)

(58) Field of Classification Search
CPC .... B23K 26/356; B23K 26/70; B23K 26/073; B23K 26/122
(Continued)

(56) References Cited

FOREIGN PATENT DOCUMENTS

CN 105246640 A * 1/2016 ........... C21D 10/005
CN 106435158 B * 12/2017 ........... C21D 10/005
(Continued)

OTHER PUBLICATIONS

Nov. 3, 2021 Office Action issued in Chinese Patent Application No. 202110205524.4.

*Primary Examiner* — Elizabeth M Kerr
*Assistant Examiner* — Alba T Rosario-Aponte
(74) *Attorney, Agent, or Firm* — Oliff PLC

(57) ABSTRACT

The present invention provides a single-beam double-physical-effect coordinating and distributing method applicable to uniform laser shock and application thereof, and belongs to the technical field of laser shock effect control. The present invention does not stipulate the specific adjusting and distributing mean, and only provides a coordinating principle and method. The present invention gives a universal and systematic method for setting absorption layer feature parameters applicable to mass laser shock uniform peening under a liquid constraint condition, so as to facilitate the relevant technician to quickly obtain the liquid constraint laser shock processing technology conforming to a distribution proportion of its double physical effects, thereby being beneficial to development and application of the laser shock peening treatment, and therefore having the good actual application value.

7 Claims, 1 Drawing Sheet

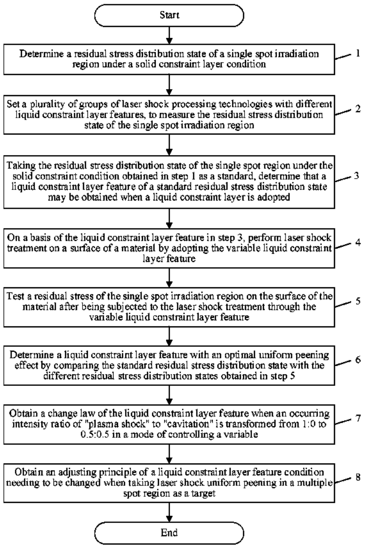

(51) Int. Cl.
*B23K 26/122* (2014.01)
*B23K 26/70* (2014.01)

(58) Field of Classification Search
USPC ...................................................... 219/121.85
See application file for complete search history.

(56) References Cited

FOREIGN PATENT DOCUMENTS

| | | | | | |
|---|---|---|---|---|---|
| CN | 110026686 A | * | 7/2019 | ........... | B23K 26/356 |
| CN | 111074061 A | * | 4/2020 | ........... | C21D 10/005 |
| CN | 111074061 B | | 7/2021 | | |

* cited by examiner

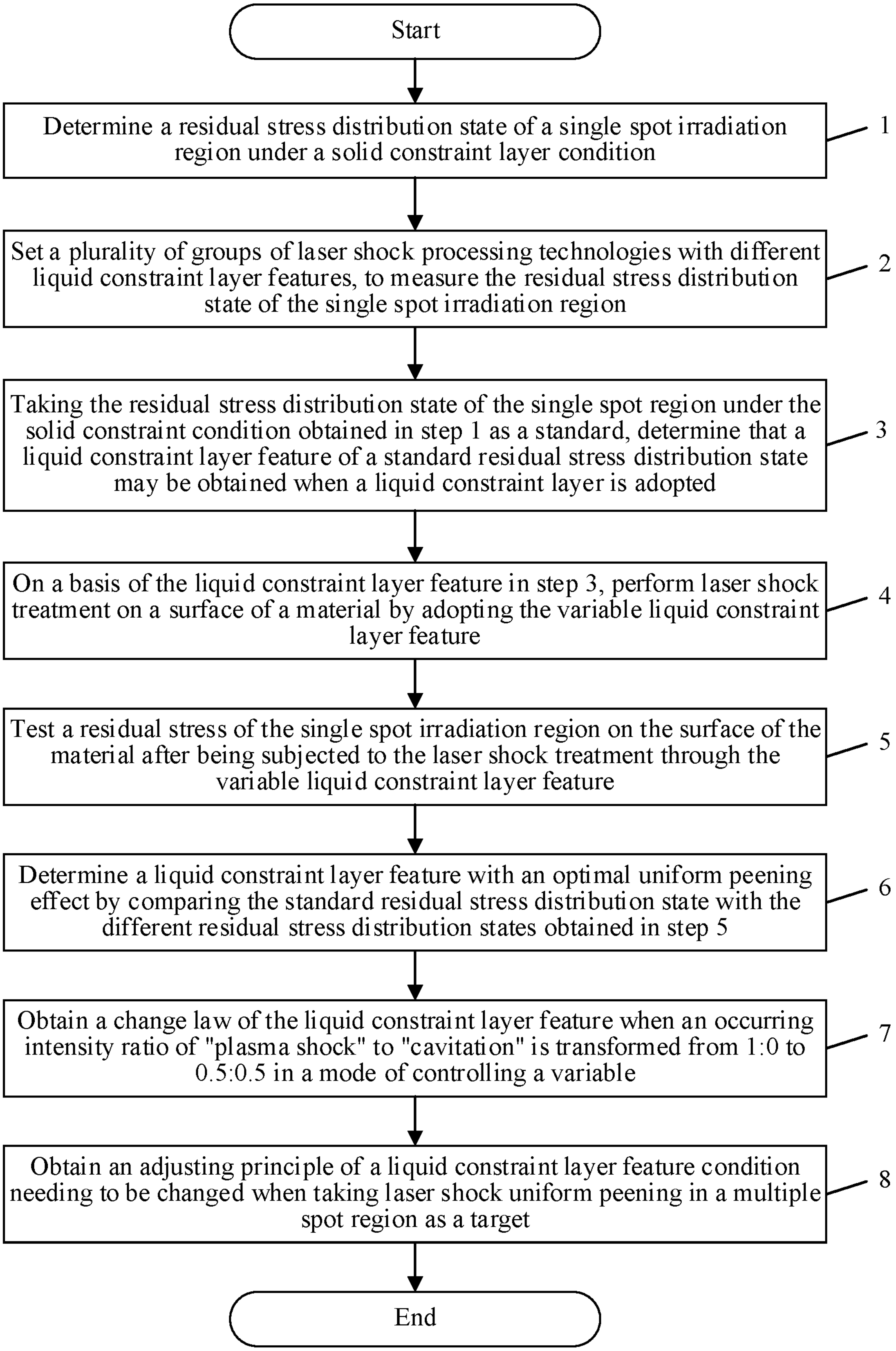
Start
Determine a residual stress distribution state of a single spot irradiation region under a solid constraint layer condition
1
Set a plurality of groups of laser shock processing technologies with different liquid constraint layer features, to measure the residual stress distribution state of the single spot irradiation region
2
Taking the residual stress distribution state of the single spot region under the solid constraint condition obtained in step 1 as a standard, determine that a liquid constraint layer feature of a standard residual stress distribution state may be obtained when a liquid constraint layer is adopted
3
On a basis of the liquid constraint layer feature in step 3, perform laser shock treatment on a surface of a material by adopting the variable liquid constraint layer feature
4
Test a residual stress of the single spot irradiation region on the surface of the material after being subjected to the laser shock treatment through the variable liquid constraint layer feature
5
Determine a liquid constraint layer feature with an optimal uniform peening effect by comparing the standard residual stress distribution state with the different residual stress distribution states obtained in step 5
6
Obtain a change law of the liquid constraint layer feature when an occurring intensity ratio of "plasma shock" to "cavitation" is transformed from 1:0 to 0.5:0.5 in a mode of controlling a variable
7
Obtain an adjusting principle of a liquid constraint layer feature condition needing to be changed when taking laser shock uniform peening in a multiple spot region as a target
8
End

SINGLE-BEAM DOUBLE-PHYSICAL-EFFECT COORDINATING AND DISTRIBUTING METHOD APPLICABLE TO UNIFORM LASER SHOCK AND APPLICATION THEREOF

TECHNICAL FIELD

The present invention belongs to the technical field of laser shock effect control, and particularly relates to a single-beam double-physical-effect coordinating and distributing method applicable to uniform laser shock and application thereof.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

Pulse laser will lead to plasma explosion on a surface of a material, so as to form GPa order of magnitude of shock pressure. Taking this as a physical basis, a researcher develops an advanced laser shock peening technology. However, in a laser shock process, a phenomenon of "residual stress hole" always occurs on a surface of a target material. That is, a geometric center position of a laser beam has small residual compressive stress distribution, even is subjected to residual tension. Forming of "residual stress hole" causes uneven residual stress distribution on the surface of the material, and adverse impact is generated on its service performance. The technical problem needing to be solved by the researcher is to weaken a "residual stress hole" effect to a greatest extent.

A technician proposes a new technology (CN 202010014492.5) of utilizing liquid to constrain a cavitation effect in the laser shock process so as to inhibit or remove the "residual stress hole". The technology explores two physical effects of "plasma shock" and "cavitation" in the laser shock process under a liquid constraint condition, and uniform peening or modification of the surface of the material is achieved through distribution of an occurring intensity of these two physical effects. An inventor finds that how to precisely distribute and adjust an action intensity of the two effects of "plasma shock" and "cavitation" in a single laser shock process is a technical key for truly applying the technology to actual production by those skilled in the art.

SUMMARY

Aiming at overcoming deficiencies existing in the prior art, the present invention provides a single-beam double-physical-effect coordinating and distributing method applicable to uniform laser shock and application thereof. The present invention proposes a universal and systematic method for setting absorption layer feature parameters applicable to mass laser shock uniform peening under a liquid constraint condition, and has a good actual application value.

Specifically, the present invention relates to the following technical solutions:

A first aspect of the present invention provides a single-beam double-physical-effect coordinating and distributing method applicable to uniform laser shock, including:

S1, determining a residual stress distribution state of a single spot irradiation region under a solid constraint layer condition;

S2, setting a plurality of groups of laser shock processing technologies with different liquid constraint layer features, to measure the residual stress distribution state of the single spot irradiation region;

S3, taking the residual stress distribution state of the single spot region under the solid constraint condition obtained in step S1 as a standard, determining that a liquid constraint layer feature of a standard residual stress distribution state may be obtained when a liquid constraint layer is adopted;

S4, on a basis of the liquid constraint layer feature in step S3, performing laser shock treatment on a surface of a material by adopting the variable liquid constraint layer feature;

S5, testing a residual stress of the single spot irradiation region on the surface of the material after being subjected to the laser shock treatment through the variable liquid constraint layer feature;

S6, determining a liquid constraint layer feature with an optimal uniform peening effect by comparing the standard residual stress distribution state with the different residual stress distribution states obtained in step S5;

S7, obtaining a change law of the liquid constraint layer feature when an occurring intensity ratio of "plasma shock" to a "cavitation" effect is transformed from 1:0 to 0.5:0.5 in a mode of controlling a variable; and S8, obtaining an adjusting principle of a liquid constraint layer feature condition needing to be changed when taking laser shock uniform peening in a multiple spot region as a target.

A second aspect of the present invention provides application of the above single-beam double-physical-effect coordinating and distributing method in material surface peening treatment.

The material surface peening treatment is specifically a laser shock peening treatment technology.

A laser shock process adopts an ns order of magnitude or faster (ps order of magnitude or fs order of magnitude) ultrafast pulse laser beam.

The beneficial technical effects of one or more of the above technical solutions are:

The above technical solution provides the single-beam double-physical-effect coordinating and distributing method applicable to the uniform laser shock. It should be noted that the present invention does not stipulate the specific adjusting and distributing means, and only provides a coordinating principle and method. The present invention gives the universal and systematic method for setting the absorption layer feature parameters applicable to mass laser shock uniform peening under a liquid constraint condition, so as to facilitate the relevant technician to quickly obtain the liquid constraint laser shock processing technology conforming to a distribution proportion of its double physical effects, thereby being beneficial to development and application of the laser shock peening treatment, and therefore having the good actual application value.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

FIG. 1 is a flow chart of a single-beam double-physical-effect coordinating and distributing method applicable to uniform laser shock of the present invention.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The present invention will be further described with reference to specific examples. The following examples are only for explaining the present invention, and do not limit the content of the present invention. Specific experimental conditions not indicated in the embodiments are usually in accordance with conventional conditions, or in accordance with the conditions recommended by a sales company; and materials, reagents, etc. used in the embodiments can be purchased through commercial channels unless otherwise specified.

As previously mentioned, how to precisely distribute and adjust an action intensity of the two effects of "plasma shock" and "cavitation" in a single laser shock process is a technical key for truly applying the technology to actual production by those skilled in the art.

As a result, the present invention provides a single-beam double-physical-effect coordinating and distributing method applicable to uniform laser shock and application thereof. The method provided by the present invention is specifically a universal and systematic method for setting absorption layer feature parameters applicable to mass laser shock uniform peening under a liquid constraint condition.

On a basis of a conventional laser shock surface processing technology, the present invention proposes to adjust a cavitation effect intensity of a surface of a to-be-processed material by changing a constraint layer material feature. The specific principle is as follows:

In a conventional laser shock processing process, the surface of the to-be-processed material needs to be coated with an absorption layer (usually a black tape or black paint) and a constraint layer (usually deionized water or K9 glass). An action of the absorption layer is to form plasma through ablation, and induce to generate a plasma shock wave. An action of the constraint layer is to limit an action direction of shock pressure, so that a pressure load mainly acts on the surface of the to-be-processed material.

In a laser shock process under a liquid constraint condition adopting the deionized water as the constraint layer, the surface of the material is further subjected to a cavitation effect under a specific technological condition. In a liquid constraint laser shock process under the specific technological condition, a plasma shock effect occurs at an ns stage of laser shock, and a GPa order of magnitude of shock wave is generated; and the cavitation effect occurs at a μs stage of laser shock, a MPa order of magnitude of shock wave is generated.

In the liquid constraint laser shock process, both the plasma shock effect and the cavitation effect occur at a focal position of a laser beam. The difference lies in that occurring of the plasma shock effect has low sensitivity for the focal position of the laser beam. That is, the cavitation effect is only formed at the focal position of the laser beam obviously, while the plasma shock effect is formed within a certain distance deviating from the focal position of the laser beam.

A refraction phenomenon occurs when laser is incident from air to a liquid medium, resulting in offset of the focal position of the laser beam in liquid. Based on this, when characteristics of the liquid constraint layer on the surface of the material are different, the focal position of the laser beam in the liquid constraint layer is changed as well. When the focal position of the laser beam is changed, variations of generating degrees of the plasma shock effect and the cavitation effect are also different. Therefore, when the characteristics of the liquid constraint layer are changed, proportions of the action intensity of the plasma shock effect and the cavitation effect are necessarily different.

In conclusion, by changing features such as a texture, a viscosity and a thickness of the constraint layer, double physical effects in the laser shock process under the liquid constraint condition may be adjusted and distributed.

On the basis of the above technical principle, the present invention proposes the single-beam double-physical-effect coordinating and distributing method based on constraint layer feature change.

The laser shock process of the present invention adopts an ns order of magnitude or faster (ps order of magnitude or fs order of magnitude) ultrafast pulse laser beam.

Therefore, in a specific implementation of the present invention, a single-beam double-physical-effect coordinating and distributing method applicable to uniform laser shock is provided, including:

S1, a residual stress distribution state of a single spot irradiation region under a solid constraint layer condition is determined.

In step S1, materials such as K9 glass may be adopted as a constraint layer to perform laser shock treatment on a to-be-processed material, and a surface residual stress distribution law of a material of a single beam irradiation region is tested.

The solid constraint condition enables the material to lose a physical basis for a cavitation effect in a laser shock process, laser shock surface processing under this condition is only subjected to a "plasma shock" effect, and an occurring intensity of its "cavitation" effect is zero. Occurring intensity of "plasma shock" and "cavitation" under this condition is 1:0.

At this time, residual stress distribution of the single spot irradiation region presents a "residual stress hole" phenomenon, that is, a central region of a single spot has a lower residual compressive stress level relative to a peripheral region.

S2, a plurality of groups of laser shock processing technologies with different liquid constraint layer features are set, to measure the residual stress distribution state of the single spot irradiation region.

In step S2, a liquid constraint layer material is adopted to perform the laser shock treatment on the to-be-processed material, and the surface residual stress distribution law of the material of a single beam irradiation region is measured.

In step S2, the specific aspect of changing the liquid constraint layer feature is not limited. Those skilled in the art may obtain the different liquid constraint layer feature conditions by changing the aspects including but not limited to a texture, a viscosity and a thickness (that is, the liquid constraint layer features include but not limited to liquid constraint layer thickness, texture and viscosity).

In a specific implementation of the present invention, those skilled in the art may set the plurality of groups of laser shock processing technologies having the different liquid constraint layer features with the different thicknesses and with the deionized water as the constraint layer; and may also change the thickness and texture at the same time to obtain the plurality of groups of laser shock processing technologies with the different liquid constraint layer features.

After the step is completed, a preliminary database of the laser shock processing technologies with the different liquid constraint layer features and the residual stress distribution state of the corresponding single spot irradiation region may be obtained.

S3, taking the residual stress distribution state of the single spot region under the solid constraint condition obtained in step S1 as a standard, it is determined that a liquid constraint layer feature of a standard residual stress distribution state may be obtained when a liquid constraint layer is adopted.

In step S3, the stress distribution states in the preliminary database obtained in step S2 and the stress distribution state obtained in step S1 are compared one by one.

A group of liquid constraint laser shock processing technologies with the same stress distribution obtained in step 1 in the preliminary database obtained in step S2 are obtained, and an occurring intensity of "plasma shock" and "cavitation" in the laser shock processing process under the liquid constraint layer feature obtained at this time is defined as 1:0.

Meanwhile, the residual stress distribution state as the standard is represented quantitatively. The specific method is: a residual stress numerical value of a central position of the single spot is determined, and defined as $RS_{(1:0\text{-}center)}$; a residual stress numerical value of an edge region of the single spot is determined, and defined as $RS_{(1:0\text{-}edge)}$; and a difference value of the above two residual stresses is taken as a "residual stress hole" intensity under the standard residual stress distribution state, that is, the "residual stress hole" intensity when the occurring intensity of "plasma shock" and "cavitation" is 1:0, to be defined as $\Delta RS_{(1:0)}-RS_{(1:0\text{-}center)}-RS_{(1:0\text{-}edge)}$.

S4, on a basis of the liquid constraint layer feature in step S3, laser shock treatment is performed on a surface of a material by adopting the variable liquid constraint layer feature.

The same with step S2 is that in step S4, the specific content of the liquid constraint layer feature is not limited either, and those skilled in the art may define the liquid constraint layer feature by changing the texture, the viscosity, the thickness and other means.

S5, a residual stress of the single spot irradiation region on the surface of the material after being subjected to the laser shock treatment through the variable liquid constraint layer feature is tested.

In step S5, the surface residual stress of the single spot irradiation region caused by the laser shock processing technologies under the different liquid constraint layer feature conditions is tested, so that a perfect database of the laser shock processing technologies with the different liquid constraint layer features and the residual stress distribution state of the corresponding single spot irradiation region are obtained.

S6, a liquid constraint layer feature with an optimal uniform peening effect is determined by comparing the standard residual stress distribution state with the different residual stress distribution states obtained in step S5.

In step S6, a corresponding liquid constraint layer feature capable of making the "residual stress hole" phenomenon disappear or be lowest in occurring degree is selected, and the occurring intensity ratio of "plasma shock" to "cavitation" under this liquid constraint layer feature condition is defined as 0.5:0.5.

It should be noted that the different residual stress distribution states obtained in step S5 probably contain a case that the occurring degree of the "residual stress hole" is more serious than the standard residual stress distribution state. At this time, the corresponding liquid constraint layer feature should be excluded firstly. That is, in an actual processing process with uniform peening as a target, liquid constraint layer feature parameters causing the more serious "residual stress hole" phenomenon should not serve as a technological condition.

In step S6, the residual stress distribution state with the occurring intensity ratio of "plasma shock" to "cavitation" being 0.5:0.5 is represented quantitatively. The specific method is: the residual stress numerical value of the central position of the single spot is determined, and defined as $RS_{(0.5:0.5\text{-}center)}$; the residual stress numerical value of the edge region of the single spot is determined, and defined as $RS_{(0.5:0.5\text{-}edge)}$; and the difference value of the above two residual stresses is taken as the "residual stress hole" intensity under the standard residual stress distribution state, that is, the "residual stress hole" intensity when the occurring intensity of "plasma shock" and "cavitation" is 0.5:0.5, to be defined as $\Delta RS_{(0.5:0.5)}=RS_{(0.5:0.5\text{-}center)}-RS_{(0.5:0.5\text{-}edge)}$.

S7, a change law of the liquid constraint layer feature when an occurring intensity ratio of "plasma shock" to a "cavitation" effect is transformed from 1:0 to 0.5:0.5 is obtained in a mode of controlling a variable.

In step S7, in a case of controlling other liquid constraint layer feature conditions to be unchanged, an influence law of the single liquid constraint layer feature condition on the change of the occurring intensity ratio of "plasma shock" to "cavitation" is obtained. For example, the feature conditions such as the texture and the viscosity of the liquid constraint layer are controlled to be unchanged, and an influence law of the liquid constraint layer thickness on the change of the occurring intensity ratio of "plasma shock" to "cavitation" is analyzed.

In another specific implementation of the present invention, an analyzing method includes:

S7.1, a "residual stress hole" intensity under a certain liquid constraint layer feature condition is determined:

The residual stress numerical value of the central position of the single spot is determined, and defined as $RS_{(test\text{-}center)}$; the residual stress numerical value of the edge region of the single spot is determined, and defined as $RS_{(test\text{-}edge)}$; and the difference value of the above two residual stresses is taken as the "residual stress hole" intensity, and defined as $\Delta RS_{(test)}=RS_{(test\text{-}center)}-RS_{(test\text{-}edge)}$.

S7.2, the occurring intensity ratio of "plasma shock" to "cavitation" under the constraint layer feature condition of step S7.1 is defined:

The occurring intensity ratio of "plasma shock" to "cavitation" under the constraint layer feature condition is defined as:

$$\frac{\Delta RS_{(1:0)}-\Delta RS_{(0.5:0.5)}}{(\Delta RS_{(1:0)}-\Delta RS_{(0.5:0.5)})+\Delta RS_{(test)}}:\frac{\Delta RS_{(test)}}{(\Delta RS_{(1:0)}-\Delta RS_{(0.5:0.5)})+\Delta RS_{(test)}}$$

S7.3, the occurring intensity ratio of "plasma shock" to "cavitation" corresponding to laser shock processing technologies under the different liquid constraint conditions is obtained by performing intensity calculation as shown in step S7.1 on the "residual stress hole" under other different obtained liquid constraint layer conditions.

S8, an adjusting principle of a liquid constraint layer feature condition needing to be changed when taking laser shock uniform peening in a multiple spot region as a target is obtained.

In step S8, on the basis of the influence law obtained in step S7, a change principle of the feature conditions such as the texture and the thickness of the liquid constraint layer required by laser shock uniform peening is obtained, so as to obtain the corresponding occurring intensity ratio of "plasma shock" to "cavitation" capable of being obtained through the laser shock processing technologies under the different liquid constraint layer features.

In step S8, a final database based on double-physical-effect distribution of a variable constraint layer feature is established, and the final database contains a distribution proportion of the occurring intensity of "plasma shock" to "cavitation" capable of being induced by any obtained liquid constraint layer feature condition. According to a processing requirement of the laser shock treatment of a multiple beam region, liquid conforming to the distribution proportion of its double physical effects is selected from the final database to constrain the laser shock processing technology.

In a specific implementation of the present invention, application of the above single-beam double-physical-effect coordinating and distributing method in material surface peening treatment is provided.

The material surface peening treatment is specifically a laser shock peening treatment technology.

A laser shock process adopts an ns order of magnitude or faster (ps order of magnitude or fs order of magnitude) ultrafast pulse laser beam.

The following further explains and describes the present invention through embodiments, but does not constitute a limitation of the present invention. It should be understood that the embodiments are merely intended to describe the present invention rather than to limit the scope of the present invention.

Embodiment 1 takes an example of establishing a final database for constraining a distribution proportion of double physical effects of "plasma shock" and "cavitation" in laser shock through liquid with a variable constraint layer thickness.

1. K9 glass with a thickness of 1.5 mm is adopted as a constraint layer to perform laser shock treatment on a certain metal material sample, and a surface residual stress distribution law of a material of a single beam irradiation region is tested. An occurring intensity of "plasma shock" and "cavitation" under this condition is defined as 1:0.
2. A plurality of groups of laser shock processing technologies with different deionized water constraint layer thicknesses are set, to measure a residual stress distribution state of a single spot irradiation region. The present embodiment sets the deionized water thickness to be 1 mm-4 mm, and the plurality of groups of laser shock processing technologies are set according to a law that the thickness is increased by 0.2 mm one by one.
3. Taking the residual stress distribution state of the single spot region under a solid constraint condition obtained in step 1 as a standard, it is determined that a liquid constraint layer thickness of the standard residual stress distribution state may be obtained to be 1.2 mm when a deionized water constraint layer is adopted; the occurring intensity of "plasma shock" and "cavitation" in a laser shock processing process with the liquid constraint layer thickness being 1.2 mm is defined as 1:0; a residual stress numerical value $RS_{(1:0\text{-}center)}$ of a central position of a single spot is determined to be ≈−100 MPa; a residual stress numerical value $RS_{(1:0\text{-}edge)}$ of an edge region of the single spot is determined to be ≈−200 MPa; and a "residual stress hole" intensity $\Delta RS_{(1:0)}$ when the occurring intensity of "plasma shock" and "cavitation" is 1:0=[(−100)−(−200)] MPa=100 MPa.
4. On the basis of the 1.2 mm deionized water constraint layer thickness in step 3, the variable deionized water constraint layer thickness is adopted to perform laser shock treatment on a surface of a material. The present embodiment directly adopts the laser shock processing technologies with the different constraint layer thicknesses defined in step 2.
5. A residual stress of the single spot irradiation region on the surface of the material subjected to laser shock treatment with the variable deionized water constraint layer thickness is tested. The present embodiment directly adopts residual stress test data obtained in step 2 after processing through the different laser shock processing technologies.
6. By comparing the residual stress distribution state when the occurring intensity of "plasma shock" and "cavitation" is 1:0 with the different residual stress distribution states obtained in step 5, it is determined that the deionized water constraint layer thickness capable of making the "residual stress hole" phenomenon disappear is 2 mm; the occurring intensity ratio of "plasma shock" to "cavitation" under the laser shock technology with the deionized water constraint layer thickness being 2 mm is defined as 0.5:0.5; the "residual stress hole" phenomenon under this condition is removed, the residual stress numerical value $RS_{(0.5:0.5\text{-}center)}$ of the central position of the single spot is ≈−200 MPa, and the residual stress numerical value $RS_{(0.5:0.5\text{-}edge)}$ of the edge region of the single spot is ≈−200 Mpa; and the "residual stress hole" intensity $\Delta RS_{(0.5:0.5)}$ when the occurring intensity of "plasma shock" and "cavitation" is 0.5:0.5=[(−200)−(−200)] MPa=0 MPa.
7. Features such as a texture and a viscosity of the deionized water constraint layer are kept unchanged, and a change law of the deionized water constraint layer thickness when the occurring intensity ratio of "plasma shock" to "cavitation" is transformed from 1:0 to 0.5:0.5 is judged and analyzed.

7.1, a "residual stress hole" intensity under other processing technological conditions when the deionized water constraint layer thickness is 1 mm-4 mm is determined: taking a processing technology with the deionized water thickness being 1.8 mm as an example, the residual stress numerical value $RS_{(test\text{-}center)}$ of the central position of the single spot is determined to be ≈−150 MPa; the residual stress numerical value $RS_{(test\text{-}edge)}$ of the edge region of the single spot is determined to be ≈−200 MPa; and at this time, the "residual stress hole" intensity $\Delta RS_{(test)}$=[(−150)−(−200)] MPa=50 MPa.

7.2, the occurring intensity ratio of "plasma shock" to "cavitation" under the different deionized water thickness conditions in step 7.1 is defined: taking the processing technology with the deionized water thickness being 1.8 mm as an example, the occurring intensity ratio of "plasma shock" to "cavitation" under this technological condition is defined as:

$$\frac{\Delta RS_{(1:0)} - \Delta RS_{(0.5:0.5)}}{\Delta RS_{(1:0)} - \Delta RS_{(0.5:0.5)} + \Delta RS_{(test)}} : \frac{\Delta RS_{(test)}}{\left(\Delta RS_{(1:0)} - \Delta RS_{(0.5:0.5)}\right) + \Delta RS_{(test)}} = \frac{100\text{ MPa} - 0\text{ MPa}}{(100\text{ MPa} - 0\text{ MPa}) + 50\text{ MPa}} : \frac{50\text{ MPa}}{100\text{ MPa} - 0\text{ MPa}) + 50\text{ MPa}} = 0.66:0.33$$

8. A change principle of the deionized water constraint layer thickness required by laser shock uniform peening is summarized to obtain the corresponding occurring intensity ratio of "plasma shock" to "cavitation" capable of being obtained through the laser shock processing technology under the different deionized water constraint layer thicknesses, and a final database based on double-physical-effect distribution of the variable deionized water constraint layer thickness is established, and contains the distribution proportion of the occurring intensity of "plasma shock" to "cavitation" capable of being induced by the obtained different deionized water constraint layer thickness conditions.

Embodiment 2 takes an example of establishing a final database for constraining a distribution proportion of double physical effects of "plasma shock" and "cavitation" in laser shock through liquid with a variable constraint layer viscosity.

1. K9 glass with a thickness of 1.5 mm is adopted as a constraint layer to perform laser shock treatment on a certain metal material sample, and a surface residual stress distribution law of a material of a single beam irradiation region is tested. An occurring intensity of "plasma shock" and "cavitation" under this condition is defined as 1:0.
2. A plurality of groups of laser shock processing technologies with deionized water constraint layers with different viscosities are set on the basis that a deionized water thickness is 1.6 mm, to measure a residual stress distribution state of a single spot irradiation region. The present embodiment sets that 0-80% of mass relative ratio of glycerin is added into deionized water, and the plurality of groups of laser shock processing technologies are set according to a law that 10% of glycerin is increased according to the mass relative ratio one by one.
3. Taking the residual stress distribution state of the single spot region under a solid constraint condition obtained in step 1 as a standard, it is determined that a ratio of glycerin in the deionized water of the standard residual stress distribution state may be obtained to be 60% when a deionized water constraint layer is adopted; the occurring intensity of "plasma shock" and "cavitation" in a laser shock processing process with the ratio of the glycerin in the deionized water is 10% is defined as 1:0; a residual stress numerical value $R_{(1:0\text{-}center)}$ of a central position of a single spot is determined to be ≈−100 MPa; a residual stress numerical value $RS_{(1:0\text{-}edge)}$ of an edge region of the single spot is determined to be ≈−200 MPa; and a "residual stress hole" intensity $\Delta RS_{(1:0)}$ when the occurring intensity of "plasma shock" and "cavitation" is 1:0=[(−100)−(−200)] MPa=100 MPa.
4. On the basis that the ratio of glycerin in the deionized water is 60% in step 3, the deionized water constraint layer with the variable glycerin ratio is adopted to perform laser shock treatment on a surface of a material. The present embodiment directly adopts the laser shock processing technologies with the deionized water constraint layers with the different glycerin ratios defined in step 2.
5. A residual stress of the single spot irradiation region on the surface of the material subjected to laser shock treatment with the deionized water constraint layer with the variable glycerin ratio is tested. The present embodiment directly adopts residual stress test data obtained in step 2 after processing through the different laser shock processing technologies.
6. By comparing the residual stress distribution state when the occurring intensity of "plasma shock" and "cavitation" is 1:0 with the different residual stress distribution states obtained in step 5, it is determined that the ratio of glycerin in the deionized water capable of making the "residual stress hole" phenomenon be weakest is 10%; the occurring intensity ratio of "plasma shock" to "cavitation" under the laser shock technology with the ratio of glycerin in the deionized water being 60% is defined as 0.5:0.5; the "residual stress hole" phenomenon under this condition is weakened, the residual stress numerical value $RS_{(0.5:0.5\text{-}center)}$ of the central position of the single spot is ≈−180 MPa, and the residual stress numerical value $RS_{(0.5:0.5\text{-}edge)}$ of the edge region of the single spot is ≈−200 MPa; and the "residual stress hole" intensity ΔRS(0.5:0.5) when the occurring intensity of "plasma shock" and "cavitation" is 0.5:0.5=[(−180)−(−200)] MPa=20 MPa.
7. Features such as a texture and a thickness of the deionized water constraint layer are kept unchanged, and a change law of the ratio of glycerin in the deionized water when the occurring intensity ratio of "plasma shock" to "cavitation" is transformed from 1:0 to 0.5:0.5 is judged and analyzed.

7.1, a "plasma shock" and "cavitation" intensity under other processing technological conditions when the ratio of glycerin in the deionized water is 0-80% is determined: taking a processing technology with the ratio of glycerin in the deionized water being 40% as an example, the residual stress numerical value R (test-center) of the central position of the single spot is determined to be ≈−160 MPa; the residual stress numerical value RS(of the edge region of the single spot is determined to be ≈−200 MPa; and at this time the "residual stress hole" intensity $\Delta RS_{(test)}$=[(−160)−(−200)] MPa=40 MPa.

7.2, the occurring intensity ratio of "plasma shock" to "cavitation" under the deionized water constraint layer conditions with the different glycerin ratios in step 7.1 is defined: taking the processing technology with the ratio of glycerin in the deionized water being 40% as an example, the occurring intensity ratio of "plasma shock" to "cavitation" under this technological condition is defined as:

$$\frac{\Delta RS_{(1:0)} - \Delta RS_{(0.5:0.5)}}{\Delta RS_{(1:0)} - \Delta RS_{(0.5:0.5)} + \Delta RS_{(test)}} : \frac{\Delta RS_{(test)}}{\left(\Delta RS_{(1:0)} - \Delta RS_{(0.5:0.5)}\right) + \Delta RS_{(test)}} = 0.66:0.33$$

$$\frac{100\ \text{MPa} - 20\ \text{MPa}}{(100\ \text{MPa} - 20\ \text{MPa}) + 40\ \text{MPa}} : \frac{40\ \text{MPa}}{(100\ \text{MPa} - 20\ \text{MPa}) + 40\ \text{MPa}}$$

A change principle of the ratio of glycerin in the deionized water required by laser shock uniform peening is summarized to obtain the corresponding occurring intensity ratio of "plasma shock" to "cavitation" capable of being obtained through the laser shock processing technology under the deionized water constraint layer condition of different viscosities, and a final database based on double-physical-effect distribution of the variable-viscosity deionized water constraint layer is established, and contains the distribution proportion of the occurring intensity of "plasma shock" to "cavitation" capable of being induced by the obtained deionized water constraint layer conditions of different viscosities.

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made and the like within the spirit and principle of the present invention shall fall within the protection scope of the present invention.

What is claimed is:

1. A single-beam double-physical-effect coordinating and distributing method applicable to uniform laser shock, comprising:

S1, determining a residual stress distribution state of a single spot irradiation region under a solid constraint layer condition and defining a proportion of an occurring intensity of a plasma shock effect to a cavitation effect under the solid constraint layer condition as 1:0;

S2, adopting different liquids as constraint layer conditions, setting a plurality of groups of laser shock processing technologies with different liquid constraint layer conditions to measure the residual stress distribution state of the single spot irradiation region under each group of liquid constraint layer conditions; so that a preliminary database of relationships between the laser shock processing technologies under the different liquid constraint layer conditions and the residual stress distribution state of the corresponding single spot irradiation region may be obtained;

S3, taking the residual stress distribution state of the single spot irradiation region under the solid constraint condition obtained in step S1 as a benchmark, from the preliminary database in step S2, for each group of the liquid constraint conditions performing the following operations:

determining a liquid constraint layer condition that yields a residual stress distribution state identical to that obtained in step S1 and defining a proportion of an occurring intensity of the plasma shock effect to the cavitation effect under the liquid constraint layer condition also as 1:0;

S4, on a basis of the liquid constraint layer conditions in step S3, performing laser shock treatment on a surface of a material by varying liquid constraint layer conditions;

S5, testing the residual stress distribution state of the single spot irradiation region on the surface of the material under the liquid constraint layer conditions of step S4;

S6, determining a liquid constraint layer condition in each group with an optimal uniform peening effect by comparing the benchmark residual stress distribution state in step S3 with the different residual stress distribution states obtained in step S5, that is, an optimal liquid constraint layer condition makes a residual stress hole phenomenon disappear or be lowest in occurring degree;

S7, by a controlled variable approach, obtaining a final database of relationships between the different liquid constraint layer conditions and the proportions of the occurring intensity of the plasma shock effect to the cavitation effect as the proportions of the occurring intensity change from 1.0 to 0.5:0.5; and S8, obtaining a required liquid constraint layer condition in the final database of step S7 when taking laser shock uniform peening in a multiple spot region as a target, and performing the laser shock treatment that conforms to a preset proportion of the occurring intensity of the plasma shock effect to the cavitation effect, wherein, each group of the liquid constraint layer conditions in step S2 and step S4 comprises any one of a texture, a viscosity and a thickness;

and in step S7, the controlled variable approach comprises:

in a case of controlling other any of two liquid constraint layer feature conditions to be unchanged, obtaining relationships between the varying single liquid constraint layer conditions and the occurring intensity proportions of the plasma shock effect to the cavitation effect.

2. The method according to claim 1, wherein in step S1, K9 glass is adopted as a constraint layer feature.

3. The method according to claim 1, wherein in step S3, the residual stress distribution states in the preliminary database obtained in step S2 and the residual stress distribution state obtained in step S1 are compared one by one; and the residual stress distribution state under the solid constraint layer condition as the benchmark is represented quantitatively; and the specific method is: a residual stress numerical value of a central position of a single spot is determined, and defined as $RS_{(1:0\text{-}center)}$; a residual stress numerical value of an edge region of the single spot is determined, and defined as $RS_{(1:0\text{-}edge)}$; and a difference value of the above two residual stresses is taken as a residual stress hole intensity under the benchmark residual stress distribution state, that is, the residual stress hole intensity when the proportions of the occurring intensity of the plasma shock effect to the cavitation effect is 1:0, is defined as $\Delta RS_{(1:0)} = RS_{(1:0\text{-}center)} - RS_{(1:0\text{-}edge)}$.

4. The method according to claim 1, wherein in step S4, performing the laser shock treatments on the surface of the material under varied liquid constraint layer conditions, so that a perfect database of the preliminary database is obtained.

5. The method according to claim 1, wherein in step S6, the optimal liquid constraint layer condition, which is capable of making the residual stress hole phenomenon disappear or be lowest in occurring degree, is selected, and the occurring intensity proportion of the plasma shock effect to the cavitation effect under this optimal liquid constraint layer condition is defined as 0.5:0.5; and the residual stress distribution state when the occurring intensity proportion of the plasma shock effect to the cavitation effect is 0.5:0.5 is represented quantitatively; and the specific method is: a residual stress numerical value of a central position of a single spot is determined, and defined as $RS_{(0.5:0.5\text{-}center)}$; a residual stress numerical value of an edge region of the single spot is determined, and defined as $RS_{(0.5:0.5\text{-}edge)}$; and a difference value of the above two residual stresses is taken as a residual stress hole intensity under the benchmark residual stress distribution state, that is, the residual stress hole intensity when the occurring intensity of the plasma shock effect to the cavitation effect is 0.5:0.5, is defined as $\Delta RS_{(0.5:0.5)}=RS_{(0.5:0.5\text{-}center)}-RS_{(0.5:0.5\text{-}edge)}$.

6. The method according to claim 1, wherein in step S7, the method comprises:

S7.1: determining a residual stress hole intensity under a certain liquid constraint layer condition:

determining a residual stress numerical value of a central position of a single spot, to be defined as $RS_{(test\text{-}center)}$; determining a residual stress numerical value of an edge region of the single spot, to be defined as $RS_{(test\text{-}edge)}$; and taking a difference value of the above two residual stresses as the residual stress hole intensity, to be defined as $\Delta RS_{(test)}=RS_{(test\text{-}center)}-RS_{(test\text{-}edge)}$;

S7.2: defining the occurring intensity proportion of the plasma shock effect to the cavitation effect under the constraint layer condition of step S7.1:

defining the occurring intensity proportion of the plasma shock effect to the cavitation effect under the constraint layer condition as:

$$\frac{\Delta RS_{(1:0)}-\Delta RS_{(0.5:0.5)}}{\left(\Delta RS_{(1:0)}-\Delta RS_{(0.5:0.5)}\right)+\Delta RS_{(test)}}:\frac{\Delta RS_{(test)}}{\left(\Delta RS_{(1:0)}-\Delta RS_{(0.5:0.5)}\right)+\Delta RS_{(test)}};$$

and

S7.3: obtaining the occurring intensity proportions of the plasma shock effect to the cavitation effect corresponding to the laser shock processing technologies under the different liquid constraint conditions by performing intensity calculation as shown in step S7.1 on the residual stress hole intensity under other different obtained liquid constraint layer conditions.

7. The method according to claim 1, in step S8, the final database based on the relationships between the different liquid constraint layer conditions and the proportions of the occurring intensity of the plasma shock effect to the cavitation effect is established, and the final database contains a distribution of the proportions of the occurring intensity of the plasma shock effect to the cavitation effect, capable of being induced by any obtained liquid constraint layer feature condition; and according to a processing requirement of the laser shock treatment of a multiple beam region, a liquid constraint layer condition conforming to the distribution proportion of the plasma shock effect to the cavitation effect is selected from the final database to perform the laser shock treatment.

* * * * *